United States Patent [19]

Patil et al.

[11] Patent Number: 5,609,817
[45] Date of Patent: Mar. 11, 1997

[54] EXTRUSION-BLOWN FILMS FROM GRAFT POLYMERS PREPARED FROM CEREAL FLOUR

[75] Inventors: Damodar R. Patil, Waseca, Minn.; George F. Fanta, Peoria, Ill.

[73] Assignee: The United States of America as represented by the Secretary of Agriculture, Washington, D.C.

[21] Appl. No.: 468,489

[22] Filed: Jun. 6, 1995

[51] Int. Cl.⁶ .................................................. B29C 55/28
[52] U.S. Cl. ..................... 264/564; 264/211.11; 523/124; 523/128; 527/313
[58] Field of Search ........................... 264/564, 514, 264/211.11; 523/124, 128; 527/313

[56] References Cited

U.S. PATENT DOCUMENTS

| | | | |
|---|---|---|---|
| 3,949,145 | 4/1976 | Otey et al. | 428/423 |
| 4,026,849 | 5/1977 | Bagley et al. | 260/17.4 GC |
| 4,045,387 | 8/1977 | Fanta et al. | 260/17.4 GC |
| 4,098,859 | 7/1978 | Cummisford et al. | 106/137 |
| 4,839,450 | 6/1989 | Fanta et al. | 527/313 |
| 5,032,337 | 7/1991 | Nachtergaele et al. | 264/211.11 |
| 5,112,903 | 5/1992 | Sakakibara et al. | 525/54.2 |
| 5,183,690 | 2/1993 | Carr et al. | 264/211.11 |
| 5,275,774 | 1/1994 | Bahr et al. | 264/211.11 |
| 5,288,318 | 2/1994 | Mayer et al. | 264/211 |
| 5,500,465 | 3/1996 | Krishnan et al. | 523/124 |

OTHER PUBLICATIONS

Dennenberg et al., "A New Biodegradable Plastic Made from Starch Graft Poly(methyl Acrylate) Copolymer"; *J. Appl. Poly. Sci.*; 22:459–465 (1978).
*Encyclopedia of Polymer Science and Technology*; John Wiley & Sons, Inc.; vol. 6; p. 764 (1967).
J.C. Arthur, Jr.; *Advan. Macromol. Chem.*; "Graft Polymerization onto Polysaccharides"; 2:1–87 (1970).
G.F. Fanta and W.M. Doane, "Grafted Starches"; in *Modified Starches: Properties and Uses*, O.B. Wurzburg, ed., CRC Press, pp. 149–178 (1986).

*Primary Examiner*—Jeffery R. Thurlow
*Attorney, Agent, or Firm*—C. Andrew Watkins; M. Howard Silverstein; John Fado

[57] ABSTRACT

Moisture-shrinkable films can be extrusion blown from flour-poly(methyl acrylate) graft copolymers. The films shrink when exposed at room temperature to relative humidities approaching 100%. The films have potential application in shrink-wrapping irregularly shaped articles without application of heat. Easy removal of the films by water washing is another feature suitable for this use. This invention allows the use of unmodified cereal flour in lieu of gelatinized starch as the substrate for graft polymerization. This substitution greatly simplifies the preparation and isolation of the graft copolymers and reduces the expense of the process by lowering raw material costs.

10 Claims, No Drawings

EXTRUSION-BLOWN FILMS FROM GRAFT POLYMERS PREPARED FROM CEREAL FLOUR

BACKGROUND OF THE INVENTION

1. Field of the Invention

The United States produces more than 6 billion lb. of plastic film each year, virtually all of which is made from petroleum based raw materials. These films are made most economically by the extrusion blowing process, in which a tubular extruded bubble is expanded and shaped by an air stream at the exit of the extruder die.

In many packaging applications, it is desirable that a film be shrinkable so that it can be made to fit the contours of irregularly shaped articles. Shrink films are now widely used in the packaging industry. Shrinkability arises from an elastic memory imparted to the film during manufacture, and shrinkage takes place when the film tends to revert back to its original unoriented state.

Use of annually renewable, agriculturally derived products such as starch as extenders and replacements for synthetic, petroleum based polymers is currently an active area of research. Use of polysaccharides in plastics not only reduces our dependence on petrochemical-derived monomers, but also reduces problems associated with disposal. The polysaccharide portion will biodegrade, causing the finished plastic article to lose its integrity and be reduced to particles small enough to be of minimal damage to the environment. This invention relates to the preparation of films by the extrusion-blowing of formulations based on a renewable resource, i.e., cereal flour.

2. Description of the Prior Art

In U.S. Pat. No. 4,026,849, Bagley et. al. teach the preparation of plastic articles by extrusion of compositions comprising graft copolymers of starch and thermoplastic polymers such as poly(methyl acrylate) (PMA). The resultant products are water-resistant, yet biodegradable; and they conserve valuable petroleum resources, because the starch portion serves as an extender for the petroleum-based polymer. Dennenberg et al. [*J. Appl. Polym. Sci.* 22: 459–465 (1978)] teach that starch graft poly(methyl acrylate) copolymers (S-g-PMA) can be extruded into products having excellent tensile strength and elongation properties.

In U.S. Pat. No. 4,839,450 (incorporated herein by reference), Fanta and Otey teach the preparation of extrusion blown films from graft copolymers of starch and poly(methyl acrylate). To obtain continuous films by extrusion blowing, it is essential that the graft polymerization reaction be carried out with a starch or starch derivative that has been rendered completely water soluble prior to the graft polymerization reaction, as opposed to a water suspension of starch granules or water-swollen starch granule fragments. Graft copolymers prepared from water-insoluble starch cannot be extrusion-blown because the presence of starch granules or granule fragments causes the undesirable formation of holes and imperfections in the film during extrusion blowing. Since a film with holes and imperfections cannot be properly expanded by internal air pressure as it exits the die, an inferior film of this type cannot be processed by the extrusion blowing technique. Films prepared according to U.S. Pat. No. 4,839,450 shrink when exposed at room temperature to relative humidities approaching 100%. These films have potential application in shrink-wrapping irregularly-shaped articles without applying heat to induce film shrinkage. Another advantage of these films is that they can be easily removed by water washing.

SUMMARY OF THE INVENTION

It has now been unexpectedly discovered that by simply substituting cereal flour for starch, high quality, extrusion-blown, starch-containing films can be prepared even though the starch component has not been solubilized prior to the graft polymerization reaction with methyl acrylate. This discovery dramatically reduces the production costs of these films due to the following factors: 1) the market price of cereal flour is less than that of cereal starch; 2) the expenses associated with modifying and/or cooking starch to render it totally water-soluble have been eliminated; and 3) graft copolymers prepared from uncooked cereal flour are easily isolated from the graft polymerization reaction mixture by filtration, in sharp contrast to S-g-PMA polymers prepared according to U.S. Pat. No. 4,839,450, which must be precipitated from the reaction mixture with an expensive and flammable organic solvent such as alcohol. Analogous to the S-g-PMA films prepared in U.S. Pat. No. 4,839,450, films prepared according to the instant invention are dimensionally stable at low to moderate relative humidities, but they shrink when exposed at ambient temperatures to relative humidities approaching 100%;. The percent shrinkage of films prepared according to the instant invention is less than that observed for rims prepared according to U.S. Pat. No. 4,839,450, probably because of the presence of the protein component in cereal flour.

In accordance with these discoveries, it is an object of this invention to provide starch-containing flexible, uniform, self-supporting films, which are moisture shrinkable at ambient temperatures, by a process which is simpler, more convenient and less expensive than the process described in the prior art.

Another object of the invention is to provide moisture-shrinkable films which are especially advantageous for packaging irregularly shaped objects.

It is also an object of the invention to provide packaging films that can be easily removed from encapsulated objects after soaking in water.

It is a further object of the invention to prepare the subject films by a conventional extrusion blowing method.

Other objects and advantages of the invention will become readily apparent from the ensuing disclosure.

DETAILED DESCRIPTION OF THE INVENTION

"Films," such as those made in accordance with the invention, are defined by the polymer industry (*Encyclopedia of Polymer Science and Technology*, John Wiley & Sons, Inc., 1967, Vol. 6, page 764) as "shaped plastics that are comparatively thin in relation to their breadth and width and have a maximum thickness of 0.010 in." Self-supporting films are those capable of supporting their own weight. "Uniform films," as used in this application, refer to those which are virtually free of breaks, tears, holes, bubbles, and striations.

The term "extrusion blowing" is well known in the art and is distinguished from simple extrusion in that it relates to shaping a tubular extrudate or "bubble" into its final form by an internal stream of air, the internal stream causing expansion of the bubble to several times the size of the die opening. Films prepared by this technique are commonly referred to as "blown films." "Moisture-shrinkable," as used herein, refers to films that can be shrunk by simple exposure to high relative humidity (near 100%) at ambient temperatures (less than 35° C.).

Graft polymerization of vinyl and acrylic monomers onto starch and other polysaccharides is well known in the prior art, and a number of reviews on this subject have appeared in the literature [e.g., J. C. Arthur Jr., *Advan. Macromol. Chem.* 2:1 (1970); also G. F. Fanta and W. M. Doane, in "Modified Starches: Properties and Uses," O. B. Wurzburg, ed, CRC Press, 1986, p. 149. Any monomer yielding a thermoplastic polymer having a glass transition temperature of less than about 25° C. can be used in the invention. An example of such a polymer is poly(methyl acrylate), which has a glass transition temperature of 8° C. Many methods are known for the initiation of graft polymerization, e.g., ceric ion, cobalt-60 irradiation, electron beam irradiation, ozone, ferrous ion-peroxide, or other redox systems. The amount of initiator needed to promote the polymerization could be readily determined by the skilled artisan. For instance, it is apparent from a comparison of examples 1A and 1B in Table I, below, that the level of ceric ion should be at least between 0.5 and 1.0 mole per 100 anhydroglucose units (AGU).

4,839,450, the only exceptions being that: 1) the flour has not been chemically modified or altered in any way to improve its water solubility, and 2) the flour-water suspension has not been heated or treated by any other method to obtain a water solution of flour prior to the graft polymerization reaction with methyl acrylate.

In view of the teachings in U.S. Pat. No. 4,839,450 that starch must be solubilized prior to graft polymerization it was unexpected that graft copolymers prepared by substituting cereal flour for starch in the graft polymerization reaction could be extrusion blown into flexible, self supporting, continuous films, even though no attempt was made to dissolve the flour in water by either derivatization or cooking. The advantages of this invention are realized by utilizing essentially whole cereal flour, that is, cereal flour which has been dry-milled without separation of the proteinaceous components. This finding is especially surprising when one considers that cereal flour is composed of over 80% granular, unmodified starch. Reasons for this dramatic difference in behavior between starch granules present in a dry-milled sample of cereal flour and starch granules isolated and purified by the well-known wet-milling process still remain obscure.

TABLE I (Yellow Corn Flour)

| Example | Polymerization Conditions | | | | | Polymer Properties | | | |
|---|---|---|---|---|---|---|---|---|---|
| | Flour Pretreatment | Grams MA | Grams CAN | AGU/Ce | Method of CAN Addn | PMA Content % | % Acetone soluble. | PMA Content After Acetone Extraction, % | Conversion of MA to Polymer % |
| 1A | stir @ 30° C. | 30 | 0.338 | 200 | 1 portion | 5.5 | — | — | 4 |
| 1B | stir @ 30° C. | 30 | 0.676 | 100 | 1 portion | 57.3 | 30 | 30 | 79 |
| 1C | stir @ 30° C. | 30 | 1.014 | 75 | 1 portion | 60 | 33 | 31 | 94 |
| 1D | stir @ 30° C. | 30 | 1.352 | 50 | 1 portion | 59 | 37 | 26 | — |
| 1E | stir @ 30° C. | 30 | 1.014 | 75 | 4 oprtions | 59 | 37 | 26 | 97 |
| 1F | stir @ 30° C. | 30 | 1.014 | 75 | 8 portions | 60 | 42 | 25 | 94 |
| 1G | stir @ 30° C. | 30 | 0.676 | 100 | 8 portions | 60 | 43 | 21 | 91 |
| 1H | Gelat @ 85° C. | 30 | 1.014 | 75 | 1 portion | 60 | 43 | 26 | 99 |
| 1I | Gelat @ 95° C. | 30 | 1.014 | 75 | 1 portion | 60 | 43 | 26 | 99 |
| 1J | Stir @ 30° C. | 20 | 1.014 | 75 | 1 portion | 50 | 31 | 21 | 95 |
| 1K | Stir @ 30° C. | 13.3 | 1.014 | 75 | 1 portion | 40 | 24 | 14 | 100 |

MA = methyl acrylate.
CAN = ceric ammonium nitrate.
AGU/Ce = anhydroglucose units per mole ceric ion.
PMA = poly(methyl acrylate).

Graft polymerization of vinyl and acrylic monomers onto cereal flour is also known in the prior art. For example, U.S. Pat. No. 4,045,387 teaches the graft polymerization of acrylonitrile onto cereal flour and the subsequent reaction of the resulting polymers with alkali to yield products possessing a high degree of water absorbency. However, there is nothing in the prior art to suggest the dramatic and unexpected differences between flour and starch that are observed when polymers having a low glass transition temperature are selected for grafting, and the isolated graft copolymers are subsequently processed by extrusion-blowing.

Cereal flour is a finely ground meal obtained by the milling of corn, wheat, rye, rice, oats, or other cereal grains and consists essentially of the starch and protein components of the endosperm portion of the grain. Starch is the major constituent of cereal flour, and the starch contents of corn and wheat flours are about 87% and 82%, respectively. The flour-based films of this invention are prepared by graft polymerizing methyl acrylate onto flour using substantially the same polymerization method reported in U.S. Pat. No.

The preferred weight percent synthetic polymer incorporated in the graft copolymer reaction product is about 40 to 70%. It is likely that 20–80% of the synthetic polymer incorporated into the reaction product may be present as ungrafted homopolymer. If desired, the homopolymer can be removed by solvent extraction, leaving only synthetic polymer as graft copolymer.

Extrusion blowing is the preferred method of forming the thin films of this invention; however, simple extrusion is a viable alternative for the formation of thicker rims or ribbons. For the preparation of moisture-shrinkable films, simple extrusion must be accompanied by stretching of the film to introduce biaxial orientation, a practice that is well known in the prior art. Prior to extrusion, it is essential that the graft copolymers be plasticized with water or some other plasticizing agent in an amount that will promote uniform, continuous flow through the extruder and that will yield a dimensionally stable film. Subsequent to extrusion, removal or minimization of the plasticizing agent locks the film in the stretched state. We have found that good films are obtained when the moisture content prior to extrusion blowing is in the range of about 15–20% based on the weight of the blended composition; and the moisture content after extrusion is about 10% of the resulting film.

Urea is an optional additive which facilitates extrusion of the films of this invention. The preferred concentration is about 5% of the dry weight of copolymer. Urea is believed to serve as both a plasticizer and a humectant, which retards the flash off of moisture during extrusion blowing. It is envisioned that other substances also could serve these purposes.

Other additives which may be incorporated into the composition in order to impart specific properties to the film include those conventionally incorporated into packaging films such as fungicides, insect repellents, dyes, static inhibitors, antioxidants, opacifying agents, stabilizers, etc. These materials may be employed in conventional amounts as determined by the skilled artisan.

The following examples further illustrate the invention but should not be construed as limiting the invention which is defined by the claims. All percentages herein disclosed are "by weight" unless otherwise specified.

EXAMPLE 1

Laboratory scale preparations of graft copolymers from yellow corn flour.

Reactions were carried out in a glass reaction flask equipped with a paddle stirrer. A slurry of 20 g of yellow corn flour in 200 ml of water was prepared, and the suspension was sparged with nitrogen for 45 min at 30° C. Alternatively, the mixture was heated to either 85° C. or 95° C. while sparging with nitrogen in order to gelatinize the starch component of the flour. Mixtures were cooled again to 30° C. prior to polymerization. Methyl acrylate (MA, either 30, 20 or 13.3 g) was added, followed after 5 min by a solution of eerie ammonium nitrate (CAN, either 0.338, 0.676, 1.014 or 1.352 g) in 6 ml of 1N nitric acid. For addition of CAN in either 4 or 8 equal portions, the first portion of CAN was added in 3 ml of 1N nitric acid so that the pH would be sufficiently low to preclude precipitation of insoluble eerie salts. The reaction mixture was stirred for 3 hr at 30° C.; and the polymer was separated by filtration, washed with water and dried. The poly (methyl acrylate) content of the polymer was calculated from the gain in weight of flour.

Ungrafted PMA (in addition to variable amounts of acetone-soluble graft copolymer) was extracted by dispersing the graft copolymer in acetone that contained sufficient water to impart 25% moisture to the polymer. This mixture was stirred for 24 h and was then centrifuged to separate insoluble graft copolymer from acetone-soluble polymer. Two more extractions with acetone were then carried out. Supernatant and acetone-washed graft copolymer were dried, and the weights of these fractions were used to calculate weight percent acetone-soluble polymer in the graft copolymer.

Grafted PMA was separated from flour by heating 4 g of acetone-insoluble graft copolymer in 200 ml of 1N hydrochloric acid for 2 hr under reflux. Grafted PMA was isolated by filtration, washed with water and dried under vacuum to a constant weight. Weight percent PMA in the graft copolymer was calculated from weight loss on acid hydrolysis. The results are reported in Table I.

EXAMPLE 2

Large scale preparations of graft copolymers from yellow corn flour and properties of extruded ribbons.

Polymerizations were carried out in a Ross, 2-gal., double planetary, variable speed mixer (Ross Mixing, Inc., Hauppauge, N.Y.). The mixer was jacketed for temperature control. In a typical polymerization, 500 g, dry basis, of yellow corn flour was stirred in 5-L of water, and the suspension was sparged with nitrogen for 45 rain at 30° C. Methyl acrylate (either 750, 500 or 333 g) was added, followed after 5 rain by a solution of either 16.8 or 25.35 g of eerie ammonium nitrate (CAN) in 150 ml of 1N nitric acid (added either in a single portion or portionwise). For addition of CAN in 8 equal portions, the first portion of CAN was added in about half the total volume of 1N nitric acid, so that the pH would be sufficiently low to preclude precipitation of insoluble ceric salts. The reaction mixture was stirred for 3 h at 30° C. and was then neutralized with sodium hydroxide solution to pH 7. Graft copolymer was isolated by filtration, washed with pH 10 buffer, washed with water and finally allowed to air dry to an ambient moisture content of about 5.5–6%. Small samples of graft copolymer were extracted with acetone to determine acetone-solubles. The results are reported in Table II, below.

TABLE II

| | | | | (Yellow Corn Flour) | | | | | | |
|---|---|---|---|---|---|---|---|---|---|---|
| | | | | Polymer Properties | | | Tensile Properties of Extruded Ribbon | | | |
| | Polymerization Conditions | | | PMA | % | PMA Content | | | | Longitudinal |
| | Grams | | Method of | Content | Acetone | After Acetone | UTS, N/mm$^2$ | | % E | Tear Strength, |
| Example | MA | AGU/Ce | CAN Addn | % | Soluble | Extraction, % | 7 day | 28 day | 7 day | 28 day | 28 day N/mm |
| 2A | 750 | 75 | 1 portion | 60 | 33 | 31 | 8.4 | 8.7 | 167 | 151 | 8.3 |
| 2B | 750 | 75 | 8 portions | 60 | 42 | 25 | 6.8 | 6.9 | 211 | 201 | 13.8 |
| 2C | 750 | 100 | 8 portions | 60 | 43 | 21 | 5.9 | 5.9 | 185 | 167 | 15.3 |
| 2D | 500 | 75 | 8 portions | 50 | 32 | 20 | 6.9 | 6.3 | 104 | 109 | 7.3 |
| 2E | 333 | 75 | 8 portions | 40 | 22 | 17 | 7.5 | 7.2 | 16.5 | 18.4 | 3.7 |

MA = methyl acrylate.
AGU/Ce = anhydroglucose units per mole ceric ion.
CAN = ceric ammonium nitrate.
PMA = poly(methyl acrylate).
UTS = ulitmate tensile strength.
% E = percent elongation at break.

Extrusions were carried out with a 19.05 mm laboratory extruder driven by a variable-speed Brabender Plasticorder (C. W. Brabender Instruments, Inc.). The length/diameter (L/D) ratio of the screw was 20:1, and the compression ratio was 3:1. Samples of unextracted polymer were extruded at 30 rpm through a 25.4×0.50 mm slit die heated to 130° C. Temperatures of the extruder barrel were 120° C. nearest the feed zone and 130° C. nearest the die. Variations from these set-temperatures during extrusion were about ±3° C. Samples for testing were passed twice through the extruder and were chopped in a Killion pelletizer prior to the second pass. Continuous, well-formed ribbons were formed in all experiments.

Extruded ribbons were allowed to equilibrate for 7 and 28 days at 23° C. and 50% relative humidity before testing. Differences between 7 day and 28 day tests were generally minor. Tensile strips 12.7 mm wide were tested (four replications per sample) on an Instron Universal Testing machine, Model 4201, at a crosshead speed of 5 cm/min. Grip length was 50.8 mm, and elongation was measured as displacement of the line-contact grips during tensile testing. Sample thickness was measured with an Elektro-Physik Minitest 3001 Electronic Micrometer. Tear strengths (trouser) were determined at a crosshead speed of 20 cm/min and a grip distance of 50.8 mm. In a previous study of starch-poly (methyl acrylate) graft copolymers, we found that relative standard deviations averaged 9.86% for ultimate tensile strength (UTS) and 21.9% for per cent elongation at break (%E). The results are reported in Table II.

EXAMPLE 3–6

The procedure of Example 2 was repeated, using 500 g of white corn flour (Example 3), soft wheat flour (Example 4), hard red winter wheat flour (Example 5), or hard red spring wheat flour (Example 6). Ceric ammonium nitrate was added in 8 equal portions except for Example 4A where it was added all at once. The resulted are reported in Table III, below.

EXAMPLE 7

Preparation of films from graft copolymers by extrusion blowing and tensile properties of extrusion-blown films.

Preparation of films by extrusion blowing was carried out with the extruder described in Example 2, except that the slit die was replaced by a 1-inch diameter blown film die. Extruder and die were heated to 95° C. For the first series of film preparations, water was added to the graft copolymer prior to extrusion to give a moisture content of 15%. For the second series of film preparations, urea was added to the formulation in an amount equal to 5 g per 100 g of water-moistened graft copolymer. Despite the fact that the flour component of the graft copolymer was not cooked or otherwise solubilized in water prior to graft polymerization, the resulting extrusion-blown films were continuous and well-formed. Physical testing of films was carried out as in Example 2. The results are reported in Table IV, below.

TABLE III

| | | Polymerization Conditions | | | Polymer Properties | | | Tensile Properties of Extruded Ribbon | | | | |
|---|---|---|---|---|---|---|---|---|---|---|---|---|
| | | | | | | | | UTS, N/mm² | | % E | | Longitudinal |
| Example | Flour | Grams MA | AGU/Ce | Method of CAN Addn | PMA Content % | % Acetone Soluble | PMA Content After Acetone Extraction, % | 7 day | 28 day | 7 day | 28 day | Tear Strength, 28 day N/mm |
| 3A | White corn | 750 | 75 | 8 portions | 58 | 44 | 13 | 5.3 | 5.0 | 181 | 187 | 16.5 |
| 3B | White corn | 500 | 75 | 8 portions | 49 | 34 | 12 | 5.2 | 5.1 | 88 | 97 | 9.2 |
| 3C | White corn | 333 | 75 | 8 portions | 40 | 23 | 13 | 7.0 | 7.7 | 32 | 29 | 4.4 |
| 4A | Soft wheat | 750 | 75 | 1 portion | 60 | 45 | 20 | 7.8 | 7.3 | 144 | 151 | 12.0 |
| 4B | Soft wheat | 750 | 75 | 8 portions | 60 | 33 | 38 | 7.9 | 7.1 | 214 | 212 | 13.1 |
| 4C | Soft wheat | 500 | 75 | 8 portions | 50 | 24 | 36 | 7.0 | 7.0 | 224 | 200 | 13.1 |
| 4D | Soft wheat | 333 | 75 | 8 portions | 40 | 14 | 29 | 5.3 | 5.8 | 80 | 77 | 7.0 |
| 5A | HRWN | 750 | 75 | 8 portions | 59 | 30 | 38 | 6.5 | 6.7 | 172 | 173 | 15.0 |
| 5B | HRWN | 500 | 75 | 8 portions | 50 | 21 | 34 | 7.2 | 7.4 | 184 | 185 | 12.2 |
| 5C | HRWN | 333 | 75 | 8 portions | 37 | 7 | 26 | 9.9 | 10.0 | 10 | 15 | 4.4 |
| 6A | HRSW | 750 | 50 | 8 portions | 57 | 27 | 35 | 7.4 | 7.2 | 179 | 178 | 12.4 |
| 6B | HRSW | 333 | 50 | 8 portions | 40 | 13 | 28 | 8.6 | 9.0 | 30 | 35 | 5.4 |

MA = methyl acrylate.
AGU/Ce = anhydroglucose units per mole ceric ion.
CAN = ceric ammonium nitrate.
PMA = poly(methyl acrylate).
UTS = ultimate tensile strength.
% E = percent elongation at break.
HRWN = hard red winter wheat.
HRSW = hard red spring wheat.

TABLE IV

| Example | Example Describing Polymer | Tensile Properties of Extrusion-Blown Film | | | | | | | |
|---|---|---|---|---|---|---|---|---|---|
| | | UTS, N/mm$^2$ | | % E | | Tear Strength, N/mm | | | |
| | | | | | | Longitudinal | | Transverse | |
| | | 7 day | 28 day | 7 day | 28 day | 7 day | 28 day | 7 day | 28 day |
| Graft Copolymer with 15% Water | | | | | | | | | |
| 7A | 2B | 16.4 | 11.7 | 85 | 75 | 3.7 | 2.7 | 3.1 | 3.5 |
| 7B | 3A | 5.5 | 7.9 | 99 | 100 | 7.4 | 8.5 | 10.5 | 9.6 |
| 7C | 4B | 13.3 | 13.4 | 73 | 67 | 4.4 | 5.5 | 5.7 | 8.7 |
| 7D | 5A* | 11.1 | 11.0 | 67 | 65 | 3.9 | 4.4 | 8.6 | 7.3 |
| 7E | 6A* | 14.3 | 12.0 | 55 | 65 | 3.3 | — | 3.5 | — |
| Graft Copolymer with 5% Urea and 15% Water | | | | | | | | | |
| 7F | 2B | 16.3 | 14.5 | 95 | 95 | 3.5 | 2.6 | 3.0 | 2.4 |
| 7G | 3A | 10.4 | 10.2 | 90 | 70 | 6.3 | 6.5 | 7.1 | 7.5 |
| 7H | 4B | 12.7 | 10.0 | 57 | 45 | 6.3 | 7.8 | 9.9 | 8.3 |
| 7I | 5A* | 11.0 | 13.3 | 48 | 57 | 3.0 | 2.9 | 4.1 | 6.1 |
| 7J | 6A* | 14.7 | 10.8 | 54 | 54 | 3.0 | — | 2.6 | — |

*two passes

EXAMPLE 8

Film shrinkage properties.

Rectangular specimens were cut from extrusion-blown films prepared in Example 7, and samples were stored at room temperature over water for 24 hr in a closed container (100% relative humidity). Dimensions of the samples were determined both before and after storage at 100% relative humidity, and values for per cent shrinkage were calculated. The results are reported in Table V.

TABLE V

| Example | Example Describing Polymer Film | % Shrinkage | |
|---|---|---|---|
| | | In Width | In Length |
| 8A | 7A | 18 | 16 |
| 8B | 7D | 15 | 5 |
| 8C | 7F | 15 | 12 |
| 8D | 7I | 19 | 10 |
| 8E | 7J | 12 | 8 |

We claim:

1. A moisture-shrinkable, film-forming composition comprising: (1) a graft copolymer of a cereal flour and a synthetic monomer, wherein said monomer is characterized as yielding upon polymerization a polymer having a glass transition temperature of less than about 35° C., and wherein said flour has not been modified to improve the water solubility of its starch component; and (2) an effective amount of a plasticizer capable of promoting uniform, continuous flow of said graft copolymer through an extruder.

2. A composition as described in claim 1 wherein the ratio of synthetic polymer to flour is in the range of about 40:60 to about 70:30 on a dry weight basis.

3. A composition as described in claim 1 wherein said plasticizer is selected from the group consisting of water and aqueous urea.

4. A dimensionally stable, stretched film produced from the composition of claim 1.

5. A dimensionally stable, stretched film produced from the composition of claim 2.

6. A dimensionally stable, stretched film produced from the composition of claim 3.

7. A method of preparing a moisture-shrinkable film comprising the steps of:
   a. blending at a temperature in the range of about 20° to about 40° C., a composition comprising: (1) a graft copolymer of a cereal flour and a synthetic monomer, wherein said monomer is characterized as yielding upon polymerization a polymer having a glass transition temperature of less than about 35° C., and wherein said flour has not been modified to improve the water solubility of its starch component; and (2) an effective amount of a plasticizer capable of promoting uniform, continuous flow of said graft copolymer through an extruder;
   b. forming said blended composition into a film;
   c. stretching the film into a stretched state; and
   d. rendering the film dimensionally stable in the stretched state.

8. The method as described in claim 7 wherein said plasticizer is selected from the group consisting of water and aqueous urea.

9. The method as described in claim 8 wherein steps (b), (c) and (d) are accomplished by extrusion blowing.

10. A film produced by the method of claim 9.

* * * * *